(12) United States Patent
Wada (10) Patent No.: US 8,830,364 B2
(45) Date of Patent: Sep. 9, 2014

(54) DRIVING METHOD OF SOLID-STATE IMAGING DEVICE, SOLID-STATE IMAGING DEVICE, AND IMAGING APPARATUS

(71) Applicant: FUJIFILM Corporation, Tokyo (JP)

(72) Inventor: Tetsu Wada, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 125 days.

(21) Appl. No.: 13/665,510

(22) Filed: Oct. 31, 2012

(65) Prior Publication Data

US 2013/0057736 A1 Mar. 7, 2013

Related U.S. Application Data

(63) Continuation of application No. PCT/JP2012/058182, filed on Mar. 28, 2012.

(30) Foreign Application Priority Data

Mar. 30, 2011 (JP) ................................. 2011-076343

(51) Int. Cl.
*H04N 9/04* (2006.01)
*H04N 5/355* (2011.01)

(52) U.S. Cl.
CPC ........... *H04N 9/045* (2013.01); *H04N 5/35563* (2013.01)
USPC ..................................... 348/280; 348/208.99

(58) Field of Classification Search
USPC ............................................ 348/280, 208.99
See application file for complete search history.

(56) References Cited

U.S. PATENT DOCUMENTS

| | | | |
|---|---|---|---|
| 6,724,932 B1 * | 4/2004 | Ito | 382/162 |
| 7,551,214 B2 * | 6/2009 | Hasegawa | 348/280 |
| 8,022,994 B2 * | 9/2011 | Luo et al. | 348/208.1 |
| 2006/0139469 A1 | 6/2006 | Yokota et al. | |
| 2008/0099679 A1 * | 5/2008 | Takemura et al. | 250/332 |
| 2008/0143841 A1 * | 6/2008 | Tico et al. | 348/208.99 |
| 2010/0141814 A1 * | 6/2010 | Kanai et al. | 348/280 |
| 2012/0229677 A1 * | 9/2012 | Ugawa et al. | 348/234 |
| 2012/0287294 A1 * | 11/2012 | Kaizu et al. | 348/208.4 |
| 2013/0016244 A1 * | 1/2013 | Takahashi et al. | 348/222.1 |
| 2014/0118572 A1 * | 5/2014 | Kuang et al. | 348/222.1 |

FOREIGN PATENT DOCUMENTS

| | | |
|---|---|---|
| JP | 11-355790 A | 12/1999 |
| JP | 2006-211631 A | 8/2006 |

OTHER PUBLICATIONS

International Search Report in PCT/JP2012/058182 dated Jun. 19, 2012(English Translation Thereof).

* cited by examiner

*Primary Examiner* — Nicholas Giles
*Assistant Examiner* — Abdelaaziz Tissire
(74) *Attorney, Agent, or Firm* — McGinn IP Law Group, PLLC (57) ABSTRACT

The present invention relates to a driving method of a solid-state imaging device including: driving the pixel stacked with the red filter and the pixel stacked with the blue filter which are presented on one line for every four lines of one-side pixel lines of the pixel line extending toward right-upwardly inclined direction and the pixel line extending toward left-upwardly inclined direction, and the pixel stacked with the green filter which is most adjacent to pixel stacked with the red filter and the pixel stacked with the blue filter as a low-sensitivity pixel, and driving the rest of the pixels as a high-sensitivity pixel.

16 Claims, 9 Drawing Sheets

| R | G | B | G | R | G | B | G | R |
|---|---|---|---|---|---|---|---|---|
| G | G | G | G | G | G | G | G | G |
| B | G | R | G | B | G | R | G | B |
| G | G | G | G | G | G | G | G | G |
| R | G | B | G | R | G | B | G | R |
| G | G | G | G | G | G | G | G | G |
| B | G | R | G | B | G | R | G | B |
| G | G | G | G | G | G | G | G | G |
| R | G | B | G | R | G | B | G | R |

FIG. 9

DRIVING METHOD OF SOLID-STATE IMAGING DEVICE, SOLID-STATE IMAGING DEVICE, AND IMAGING APPARATUS

TECHNICAL FIELD

The present invention relates to a driving method of a solid-state imaging device, a solid-state imaging device and an imaging apparatus, and specifically to a driving method of a single-plate solid-state imaging device, a solid-state imaging device and an imaging apparatus which are suitable for a color imaging of a subject in a high resolution and a wide dynamic range.

BACKGROUND ART

Patent Documents 1 and 2 as described below disclose a solid-state imaging device capable of imaging a color image of a subject with a high resolution in a horizontal direction and a vertical direction. A pixel array and a color filter array of the solid-state imaging device will be described with reference to FIGS. 8 and 9.

Figure 8:
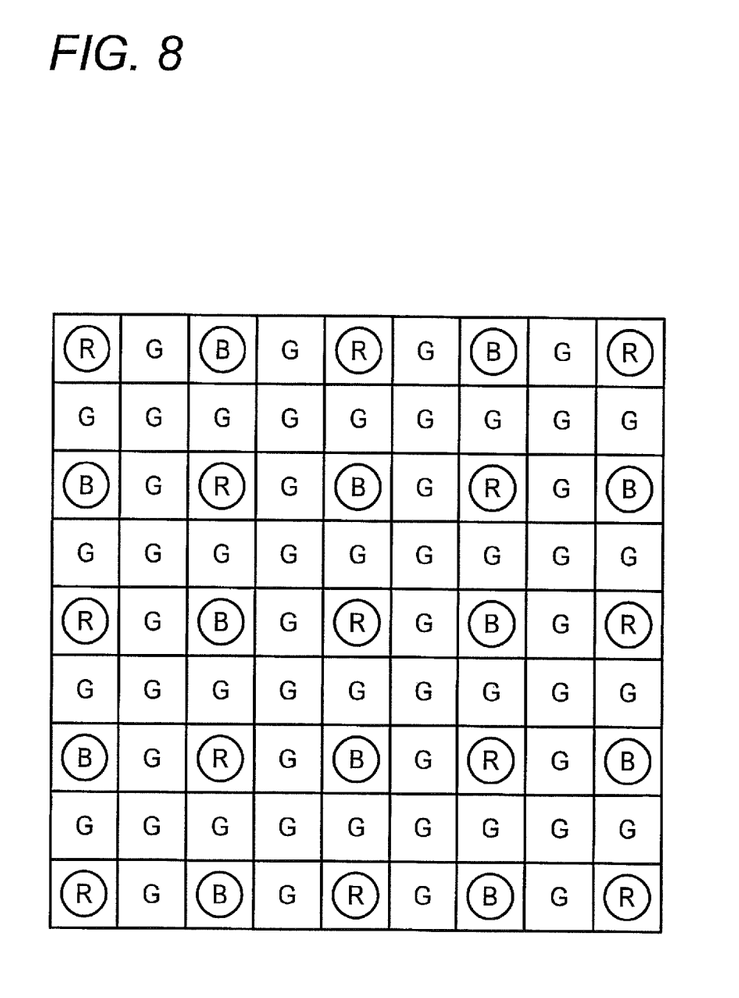
FIG. 8 is an explanatory view of a pixel array and a color filter array.

FIG. 8 illustrates an array of three primary color filters of R (red), G (green), B (blue) which is stacked on a plurality of pixels arranged in a square lattice (photoelectric conversion device: photodiode). "◯" marks are added to the R filters and the B filters such that each of the RGB arranging positions is readily identified.

In the color filter array illustrated in FIG. 8, the G filter is stacked on each of the pixels in even-numbered columns and even-numbered rows, and the R filters and the B filters are alternately stacked on the rest of the pixels in the column direction and the row direction. In other words, the pixels stacked with the G filter (G pixels) are disposed in line positions forming a quadrille, and the pixels stacked with the R filter (R pixels) and the pixels stacked with the B filter (B pixels) are disposed in eye positions of the quadrille.

Figure 9:
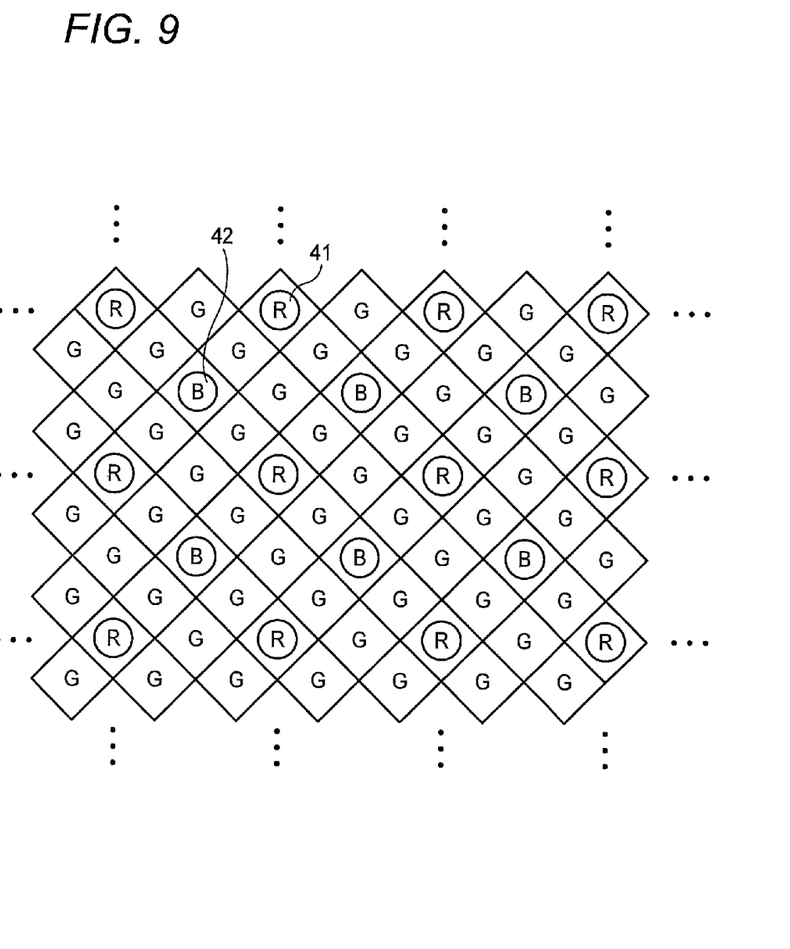
FIG. 9 is a view in which the pixel array and the color filter array in FIG. 8 are tilted by 45 degrees.

FIG. 9 is a view illustrating an array in which the pixel array and the color filter array of FIG. 8 are obliquely tilted by 45 degrees. The pixel array becomes a so-called honeycomb pixel arrangement in which the even-numbered pixel rows are deviated from the odd-numbered pixel rows by ½ pixel pitch.

Since the imaging image signal of the honeycomb pixel arrangement, i.e., check pattern positions may be obtained, when the imaging image signal of the central position of total four pixels of two pixels which are adjacent each other in the longitudinal and transverse directions, respectively, is obtained by an interpolation using the imaging image signals of the neighbors, the imaging image signal which is two times of the numbers of pixels may be obtained, thereby obtaining an image signal of a subject with a high resolution in the longitudinal direction and the transverse direction.

PRIOR ART DOCUMENT

Patent Literature

[Patent Document 1] JP-A-11-355790
[Patent Document 2] JP-A-2006-211631

SUMMARY OF THE INVENTION

Problems To Be Solved

The above-described solid-state imaging device of the pixel array and color filter array as illustrated in FIG. 9, may shoot a color image of a subject with a high resolution. However, there is a problem that an image having a wide dynamic range cannot be shot. The dynamic range may be increased using a pixel addition method that adds the imaging image signal of the adjacent pixels with the same color, but in this case, there is a problem that the resolution is sacrificed.

The object of the present invention is to provide a driving method of a solid-state imaging device, a solid-state imaging device, and an imaging apparatus which are capable of imaging a color image of a subject with a wide dynamic range while maintaining a high resolution.

Means for Solving the Problems

According to an aspect of the present invention, provided is a driving method of a solid-state imaging device in which an even-numbered pixel row is disposed with a deviation from an odd-numbered pixel row by ½ pixel pitch, both of a pixel line extending toward right-upwardly inclined direction and a pixel line extending toward left-upwardly inclined direction are composed of only pixels stacked with a green filter for every two lines, a pixel that constitutes one-side row of the odd-numbered pixel row or the even-numbered pixel row of the pixels disposed in the rest of check pattern positions on which the pixels stacked with the green filter is not disposed is a pixel stacked with a red filter and a pixel that constitutes the other-side row is a pixel stacked with a blue filter, the method including:

driving the pixel stacked with the red filter and the pixel stacked with the blue filter which are presented on one line for every four lines of one-side pixel lines of the pixel line extending toward right-upwardly inclined direction and the pixel line extending toward left-upwardly inclined direction, and the pixel stacked with the green filter which is most adjacent to the pixel stacked with the red filter or the pixel stacked with the blue filter as a low-sensitivity pixel, and driving the rest of the pixels as a high-sensitivity pixel.

According to other aspect of the present invention, provided is a solid-state imaging device including: a low-sensitivity pixel; and a high-sensitivity pixel. An even-numbered pixel row is disposed with a deviation from an odd-numbered pixel row by ½ pixel pitch, a pixel line extending toward right-upwardly inclined direction and a pixel line extending toward left-upwardly inclined direction both are composed of only pixels stacked with a green filter for every two lines, a pixel that constitutes one-side row of the odd-numbered pixel row or the even-numbered pixel row of the pixels disposed in the rest of check pattern positions on which the pixel stacked with the green filter is not disposed is a pixel stacked with a red filter and a pixel that constitutes the other-side row is a pixel stacked with a blue filter, and the filter stacked with the red filter and the pixel stacked with the blue filter which are presented on one line for every four lines of one-side pixel lines of the pixel line extending toward right-upwardly inclined direction and the pixel line extending toward left-upwardly inclined direction and the pixel stacked with the green filter which is most adjacent to pixel stacked with the red filter and the pixel stacked with the blue filter are configured as a low-sensitivity pixel, and the rest of the pixels are configured as a high-sensitivity pixel.

According to still other aspect of the present invention, provided is an imaging apparatus including: a solid-state imaging device as describe above; a driving unit configured to drive the solid-state imaging device; and a signal processing unit configured to interpolate the image signal of the pixel position of the low-sensitivity pixel with the imaging image signal of the surrounding high-sensitivity pixel.

Effects of the Invention

According to the present invention, the color image of the subject with a high resolution, a low position color, and a wide dynamic range may be imaged.

DESCRIPTION OF THE PREFERRED
EMBODIMENTS OF THE INVENTION

Hereinafter, an exemplary embodiment of the present invention will be described with reference to the accompanying drawings.

Figure 1:
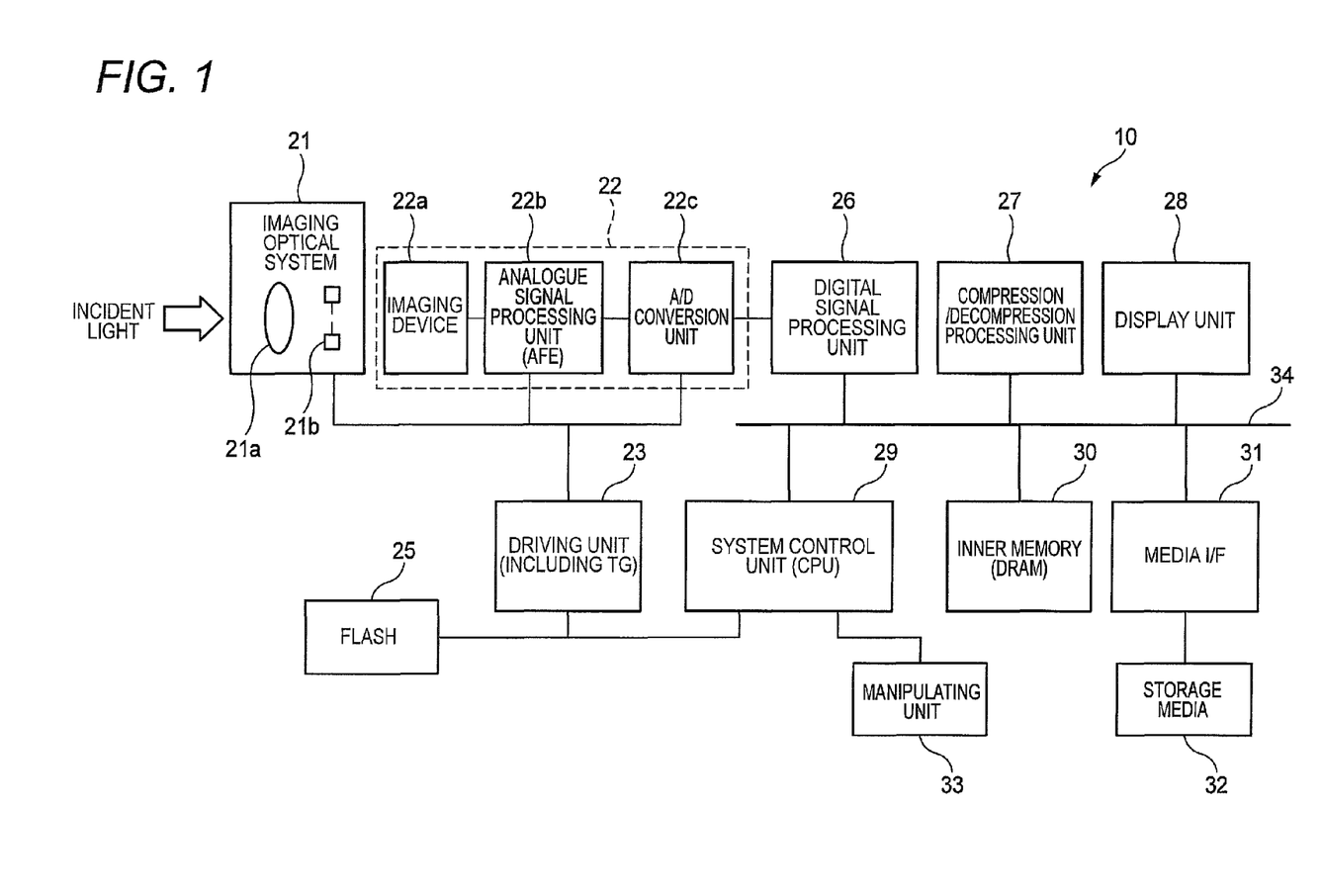
FIG. 1 is a functional block diagram of an imaging apparatus according to an exemplary embodiment of the present invention.

FIG. 1 is a functional block diagram illustrating the configuration of a digital camera (imaging apparatus) 10 on which a solid-state imaging device 22a according to an exemplary embodiment of the present invention is mounted. The digital camera 10 has an imaging optical system 21 including an imaging lens 21a or a diaphragm 21b or the like, and an imaging device chip 22 disposed in the rear end of the imaging optical system 21.

The imaging device chip 22 includes a single-plate solid-state imaging device 22a for a color imaging in which a signal reading unit thereof is CCD type or CMOS type, an analog signal processing unit (AFE) 22b that executes an analog processing such as automatic gain control (AGC) or sampling two correlation pile processing for the analog image data outputted from the solid-state imaging device 22a, and an analog to digital conversion unit (A/D) 22c that converts the analog image data outputted from the analog signal processing unit 22b into a digital image data. In the present exemplary embodiment, a CMOS type solid-state imaging device 22a is explained as an example.

The digital camera 10 further includes a driving unit (including a timing generator TG) 23 that controls the solid-state imaging device 22a, the analogue signal processing unit 22b, and the A/D 22c according to the instructions from a system control unit (CPU) 29 as described below, and a flash 25 that illuminates according to the instructions from the CPU 29. The driving unit 23 may be mounted in the imaging device chip 22.

The digital camera 10 of the present exemplary embodiment further includes a digital signal processing unit 26 that receives the digital image data outputted from the A/D 22c and performs a known image processing such as, for example, an interpolation processing, a white balance compensation, and a RGB/YC conversion processing; a compression/decompression processing unit 27 that compresses the image data into an image data in the form of, for example, a JPEG format or inversely decompresses; a display unit 28 that displays a menu or a through image or an image; the system control unit (CPU) 29 that integrally controls the entire digital camera; a media interface (I/F) unit 31 that performs an interface processing between an inner memory 30 such as a frame memory and a storage medium 32 for storing a JPEG image data; and a bus 34 that connects the digital signal processing unit 26, the compression/decompression processing unit 27, the display unit 28, the system control unit 29, and the media interface unit 31 each other. Further, a manipulation unit 33 that performs an input instruction from a user is connected to the system control unit 29.

The pixel array and the color filter array of the CMOS type solid-state imaging device 22a are the same as those of the solid-state imaging device as described in FIG. 9. The structures of them are the same in that, for example, light receiving areas for each pixel are formed equally, openings in the light blocking film are formed in the same width, and the microlens with the same shape are mounted.

The pixel array becomes a so-called honeycomb pixel arrangement in which the even-numbered pixel row is deviated from the odd-numbered pixel row by ½ pixel pitch. That is, one G filter is stacked on every pixels with one line interval of the pixel rows that are inclined by 45 degrees in right upwardly (hereinafter, the inclined pixel rows is referred to as "line"), and one G filter is stacked on every pixels with one line interval of the pixel rows that are inclined by 45 degrees in left upwardly.

The rest of pixel positions in which G filter does not stacked thereon become the check pattern positions. When the check pattern positions are separated into a first square array position which is an odd-numbered row position and a second square array position which is an even-numbered row position, the R filter is stacked on each pixel of the first square array position and the B filter is stacked on each pixel of the second square array position. That is, the odd-numbered rows (or the even-numbered rows) of the check pattern positions become the pixels stacked with the R filter, and the even-numbered rows (or the odd-numbered rows) of the check pattern positions become the pixels stacked with the B filter.

The digital camera 10 illustrated in FIG. 1 is provided with a high resolution imaging mode and a wide dynamic range imaging mode as a mode that images a color image of a subject. The user may manually select any one of the high resolution imaging mode and the wide dynamic range imaging mode from the manipulation unit 33 in FIG. 1. In a case where an automatic setting of imaging mode is selected, the wide dynamic range imaging mode may be automatically selected when the imaging image signal outputted from the solid-state imaging device 22a as a through image is interpreted by the digital signal processing unit 26 and the brightness is larger than a predetermined threshold value.

When the high resolution imaging mode is selected, the exposure times of the entire pixels in FIG. 9 become the same and the imaging image signal of each pixel is read-out. The present exemplary embodiment is a CMOS type, and as a result, the imaging image signals are read-out in the order of one pixel row in FIG. 9, the digital signal processing unit 26 in FIG. 1 calculates the R signal amount, the G signal amount, the B signal amount for the entire pixel positions in the order of image processing illustrated in FIG. 2, thereby generating a color image data of a subject.

When the imaging image signals are read-out from the solid-state imaging device 22a, the imaging image signals are inputted to the digital signal processing unit 26 in FIG. 1. The imaging image signals include a high-sensitivity G signal outputted from the G pixel (the signal in the high resolution imaging mode is referred to as a "high-sensitivity" signal, so as to distinguish the signal from the "low-sensitivity" signal used in the wide dynamic range imaging mode which will be described in the following exemplary embodiment), a high-sensitivity R signal outputted from the R pixel, and a high-sensitivity B signal outputted from the B pixel.

Figure 2:
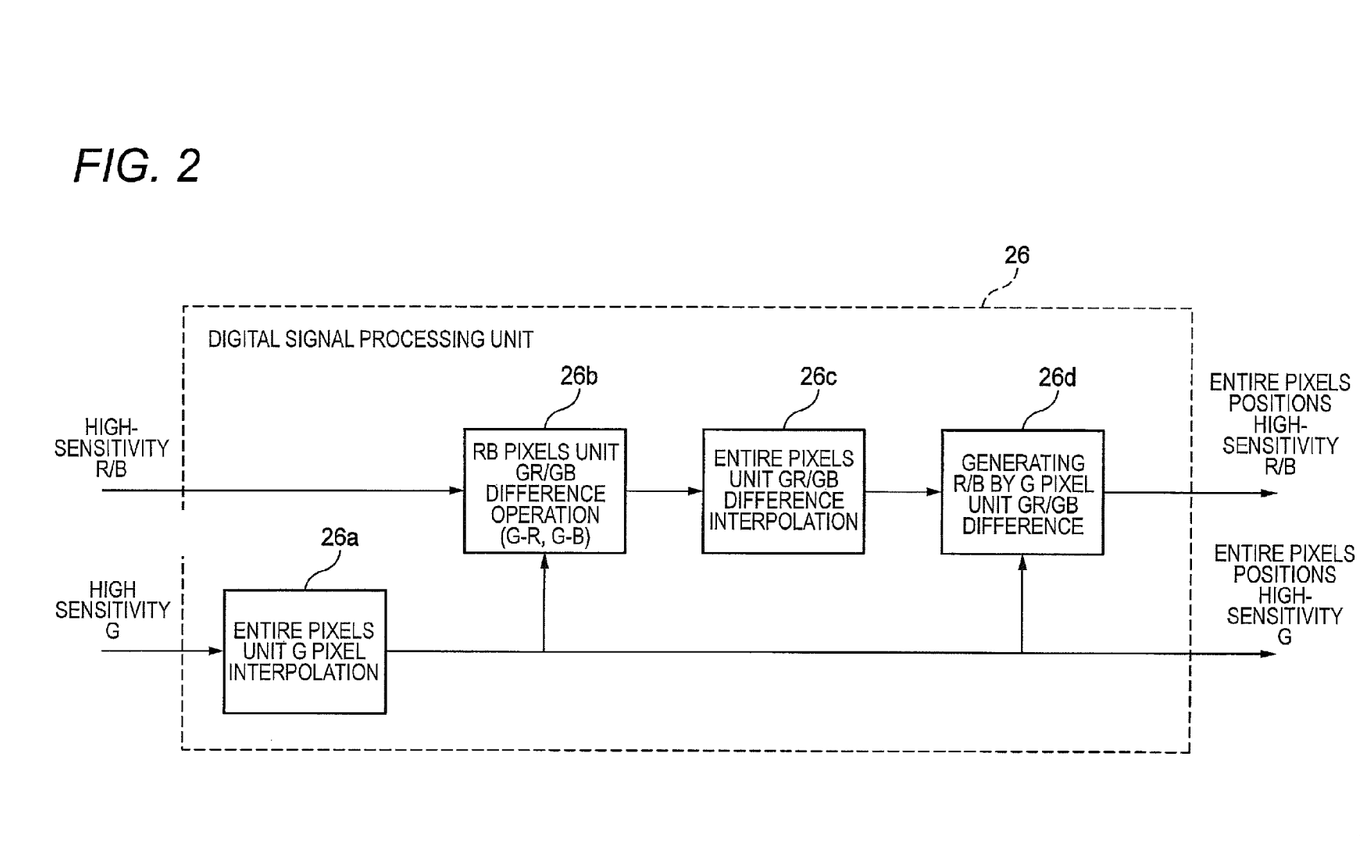
FIG. 2 is a block diagram of a digital signal processing unit illustrated in FIG. 1 at a high resolution imaging mode.

FIG. 2 is a functional block diagram of a required part of the digital signal processing unit 26 which is implemented in the high resolution imaging mode. The high-sensitivity G signal inputted into the digital signal processing unit 26 is first inputted to an entire pixels unit G pixel interpolation processing unit 26a. For example, the high-sensitivity R signal is outputted from the pixel position of R pixel 41 in FIG. 1, but the high-sensitivity G signal and the high-sensitivity B signal are not outputted from the position of the R pixel 41. As a result, the high-sensitivity G signal and the high-sensitivity B signal at the position of R pixel 41 are calculated from the output signal at the surrounding G pixel and the output signal at the surrounding B pixel.

The entire pixels unit G pixel interpolation processing unit 26a of the digital signal processing unit 26 calculates and outputs, for example, a mean value of the output signals of the eight surrounding G pixels around the R pixel position and the B pixel position as how much the high-sensitivity G signal amount in the R pixel position are and how much the high-sensitivity G signal amount in the B pixel position are based on the high-sensitivity G signal received from the solid-state imaging device 22a. With respect to the high-sensitivity G signal amount at the G pixel position, the G pixel outputs the detect signal high-sensitivity G signal amount.

The high-sensitivity R signal and the high-sensitivity B signal which are output from the solid-state imaging device 22a are received into an RB pixel unit GR difference/GB difference calculation processing unit 26b of the digital signal processing unit 26. The high-sensitivity G signal amount outputted from the G pixel interpolation processing unit 26a is also received into the calculation processing unit 26b. As a result, with respect to each of the positions of the R pixels 41 in FIG. 9, the high-sensitivity G signal amount and the detected high-sensitivity R signal amount may be known. As a result, the high-sensitivity [G–R] values at every position of the R pixels 41 are calculated by the calculation processing unit 26b. In similar, the high-sensitivity [G–B] values at every positions of the B pixels 42 are also calculated by the calculation processing unit 26b.

A GR difference·GB difference interpolation processing unit 26c of the digital signal processing unit 26 calculates the high-sensitivity [G–R] values of the rest of positions of the entire G pixels and the rest of positions of the entire B pixels by the linear interpolation operation using the calculated high-sensitivity [G–R] values at every positions of the R pixels 41, and calculates the high-sensitivity [G–B] values of the rest of positions of the entire G pixels and the rest of positions of the entire R pixels by the linear interpolation operation using the calculated high-sensitivity [G–B] values at every positions of the B pixels 42.

Using the linear interpolation operation as described above, the interpolation processing unit 26c outputs the high-sensitivity [G–R] values and the high-sensitivity [G–B] values at every pixels of the entire pixels (the G pixels, the R pixels, the B pixels) into a R signal amount·B signal amount generation processing unit 26d. The generation processing unit 26d receives the high-sensitivity G signal amount at every positions of the entire pixels from the interpolation processing unit 26a, and as a result, the generation processing unit 26d performs the operations of G−[G−R]=R, G−[G−B]=B at every positions of the entire pixels and obtains the high-sensitivity R signal amount and the high-sensitivity B signal amount to output them.

As a result, the high-sensitivity G signal amount at every positions of the entire pixels are outputted from the interpolation processing unit 26a and the high-sensitivity R signal amount, and the high-sensitivity B signal amount at every positions of the entire pixels are outputted from the generation processing unit 26d. Therefore, the image processing unit (not illustrated) of the digital signal processing unit 26 performs a gamma correction or a known image processing such as a RGB/YC conversion processing and a square conversion processing using each of these R, G, B signal amounts, and thereby generating the color image data of the subject with high resolution and low positioned color.

When the wide dynamic range imaging mode is selected, almost pixels of the entire pixels are imaged with the high-sensitivity and the rest of pixels are imaged with the low-sensitivity. For example, the exposure times of a pixel which is imaged with low-sensitivity is controlled to be shorter than the exposure times of a pixel which is imaged with high-sensitivity.

Figure 3:
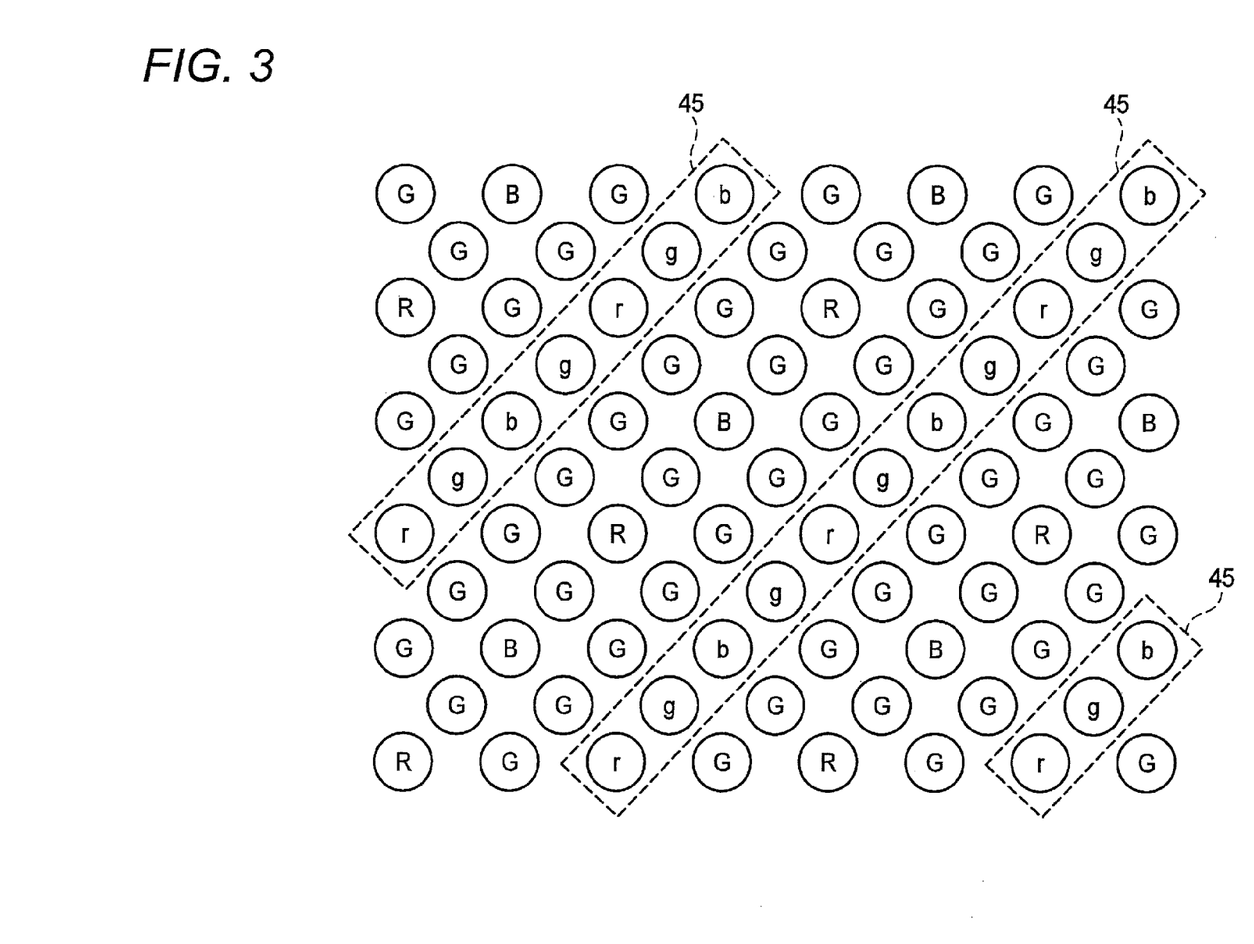
FIG. 3 is an explanatory view of a driving method of a solid-state imaging device according to a first exemplary embodiment of the present invention.

FIG. 3 is a view illustrating an example of a driving method of the solid-state imaging device 22a at the wide dynamic range imaging mode. The pixels represented by upper cases RGB indicate the pixels to be imaged with high-sensitivity, and the pixels represented by lower cases rgb indicate the pixels to be imaged with low-sensitivity. The low-sensitivity pixels line 45 (inclined pixel row) to be imaged with low-sensitivity are represented by a frame of broken line.

In the pixel array and the color filter array illustrated in FIG. 3, only the G pixel is included in the inclined pixel lines with one row interval, and the B pixel and the R pixel are included in the rest of pixel lines. As a result, the inclined pixel lines including the B pixel and the R pixel are the high-sensitivity imaging pixel line and the low-sensitivity imaging pixel line, alternately. That is, in an overall speaking, each one line including the R filter (B filter) for every four inclined pixel lines is the low-sensitivity imaging pixel line. Therefore, one or two pixels stacked with the G filter which are most adjacent (adjacent in the inclined direction) to a r pixel or b pixel on the low-sensitivity imaging pixel line, are g pixels to be imaged with low-sensitivity.

Figure 4:
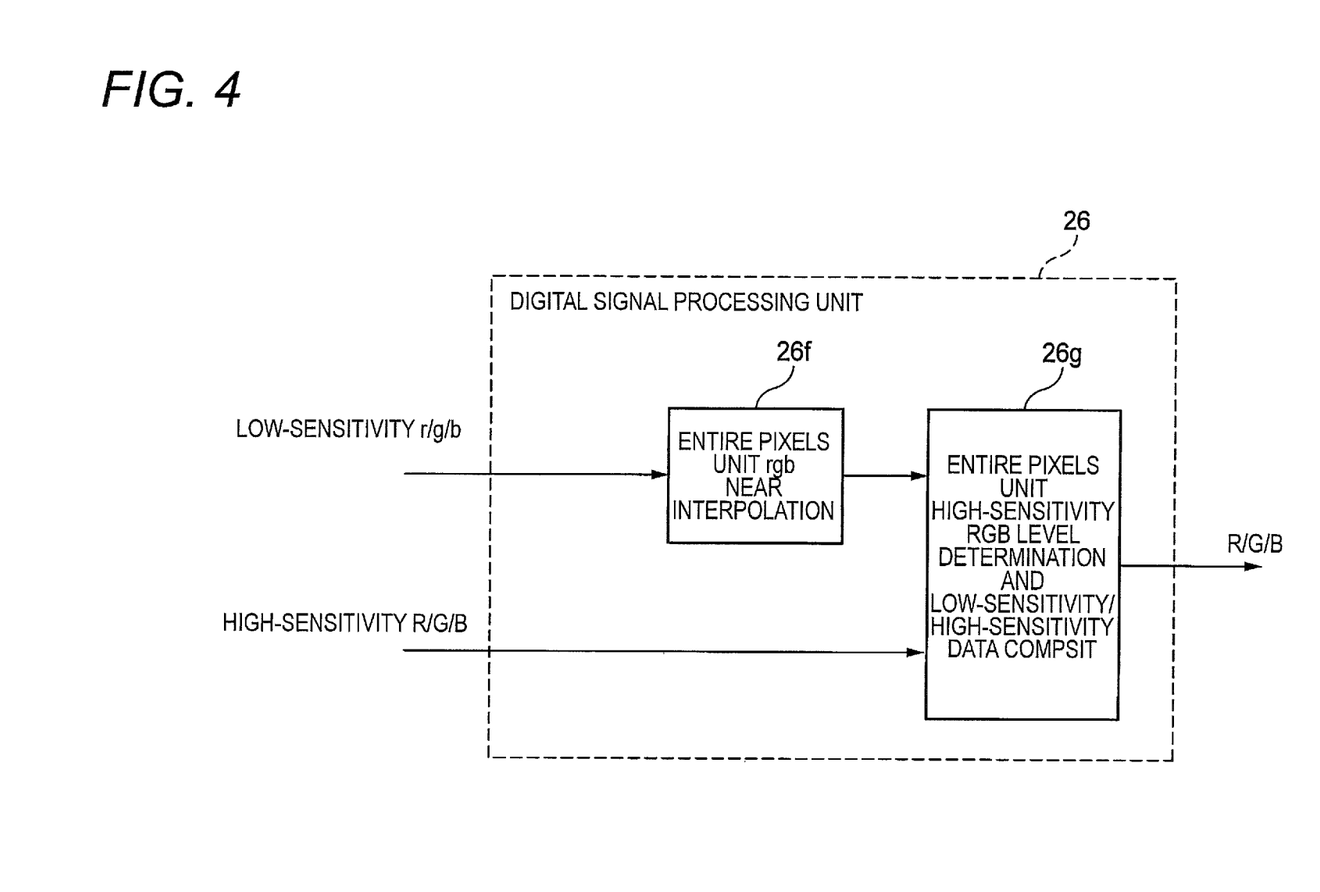
FIG. 4 is a block diagram of the digital signal processing unit illustrated in FIG. 1 at a wide dynamic range imaging mode.

FIG. 4 is a functional block diagram of a portion of the digital signal processing unit 26 which is implemented in the wide dynamic range imaging mode. The imaging image signals (low-sensitivity g signal, low-sensitivity r signal, low-sensitivity b signal) outputted from the pixels constituting the low-sensitivity pixel line 45 to be imaged with low-sensitivity illustrated in FIG. 3, are received into an entire pixels unit rgb near interpolation processing unit 26f.

The interpolation processing unit 26f obtains the low-sensitivity r signal amount, the low-sensitivity g signal amount, the low-sensitivity b signal amount by linear interpolation using the imaging image signal amounts (low-sensitivity r signal amount, low-sensitivity g signal amount, low-sensitivity b signal amount) obtained by the actual low-sensitivity imaging pixel, and outputs the calculated result into an entire pixels unit high-sensitivity RGB level determination & low-sensitivity high-sensitivity data integration processing unit 26g.

In a case where the interpolation processing unit 26f performs a linear interpolation operation, the number of the pixels is small against the entire pixels to be imaged with low-sensitivity, and as a result, when the linear interpolation is performed using a wider area of low-sensitivity signal, the resolution is further lowered. As a result, a near interpolation operation processing is performed using, for example, only the adjacent the same color of low-sensitivity signal.

The integration processing unit 26g receives the imaging image signals from the high-sensitivity imaging driving pixels (the high-sensitivity R signal, the high-sensitivity G signal, the high-sensitivity B signal), in addition to receiving the low-sensitivity signal from the interpolation processing unit 26f. The integration processing unit 26g obtains the high-sensitivity R signal amount, the high-sensitivity G signal amount and the high-sensitivity B signal amount at each position of the entire pixels positions using the received the imaging image signal by, for example, the interpolation operation.

Then, the integration processing unit 26g generates the subject image data using the high-sensitivity signals as a main part for the normal exposure portion of the subject image (since the number of the low-sensitivity pixels are small and the resolution is not obtained, the low-sensitivity signals may not be used for the normal exposure portion), and generates the subject image data using the low-sensitivity signals as a main part for the highlight portion of the subject image. A fine resolution at the highlighted portion of the subject image does not cause increase the image quality. Therefore, a priority is given to the dynamic range by using the low-sensitivity signals as a main part of the subject image. The determination whether there is the highlighted portion may be detected by determining whether the level of the high-sensitivity signal amount is equal to or more than a predetermined threshold value.

The red signal, the green signal, the blue signal based on the integration result of the integration processing unit 26g are subjected to a known image processing by the image processing unit of the following stage, and a color image data of the subject having the high resolution and the wide dynamic range is generated.

In the exemplary embodiment in FIG. 3 as described above, the inclined low-sensitivity pixel lines 45 to be imaged with low-sensitivity are for dynamic range magnification and cannot obtain the high-intensity information, and hardly contribute to the high resolution of the imaging image. However, the high-sensitivity imaging G pixel must be disposed on the top, bottom, left and right of the each of the low-sensitivity imaging pixel (the low-sensitivity pixel), the image data at the low-sensitivity pixel position is interpolated by the detecting signals of the surrounding G pixels, and thus, the decrease of the resolution caused by the installation of the low-sensitivity pixel, may be suppressed. As a result, the image data with the high resolution and the wide dynamic range may be obtained.

When the deterioration of the sensitivity of the pixels is performed by controlling the exposure times, the sensitivity per unit time of a pixel itself is the same to that of the high-sensitivity pixel. As a result, when the dynamic range is not magnified, the exposure times for the entire pixels are to be equal, and thus, the image data with the high resolution may be obtained by the high resolution imaging mode.

When the dynamic range is expanded, the exposure times of the low-sensitivity pixel need to be shorter than those of the high-sensitivity pixel. In the present exemplary embodiment, the low-sensitivity pixels are disposed on the inclined pixel lines, and as a result, the address difference of the low-sensitivity pixels which are adjacent to each other in the horizontal direction. Therefore, the driving control may readily be addressed to the low-sensitivity pixels.

Figure 5:
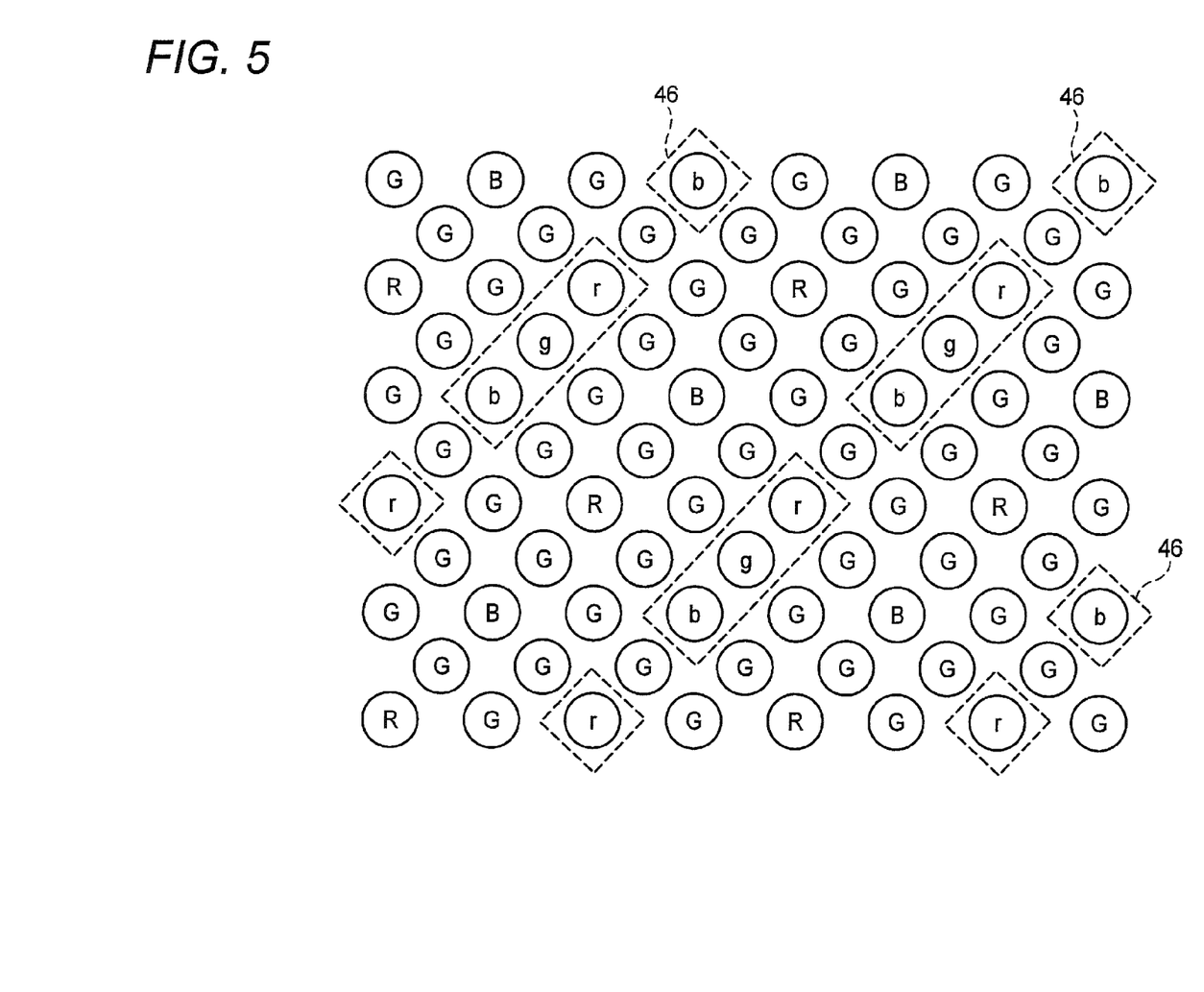
FIG. 5 is an explanatory view of an exemplary embodiment which is replaced with FIG. 3.

FIG. 5 is an explanatory view of another exemplary embodiment which replaces the exemplary embodiment in FIG. 3. In the exemplary embodiment in FIG. 3, all the pixels in the low-sensitivity pixel lines 45 are the low-sensitivity pixels. On the other hand, in the exemplary embodiment in FIG. 5, a g pixel for every two g pixels on the low-sensitivity pixel lines 45 in FIG. 3 becomes a high-sensitivity G pixel to form a low-sensitivity pixel line 46 of the three pixels between the G pixels. Therefore, one pixel stacked with the G filter which are most adjacent (adjacent in the inclined direction) to a r pixel or a b pixel on the low-sensitivity imaging pixel line, becomes a g pixel to be imaged with low-sensitivity.

As such, one pixel of the four pixels in the inclined low-sensitivity pixel line becomes a high-sensitivity G pixel, and the decrease of the resolution in the inclined pixel line direction may be suppressed.

Figure 6:
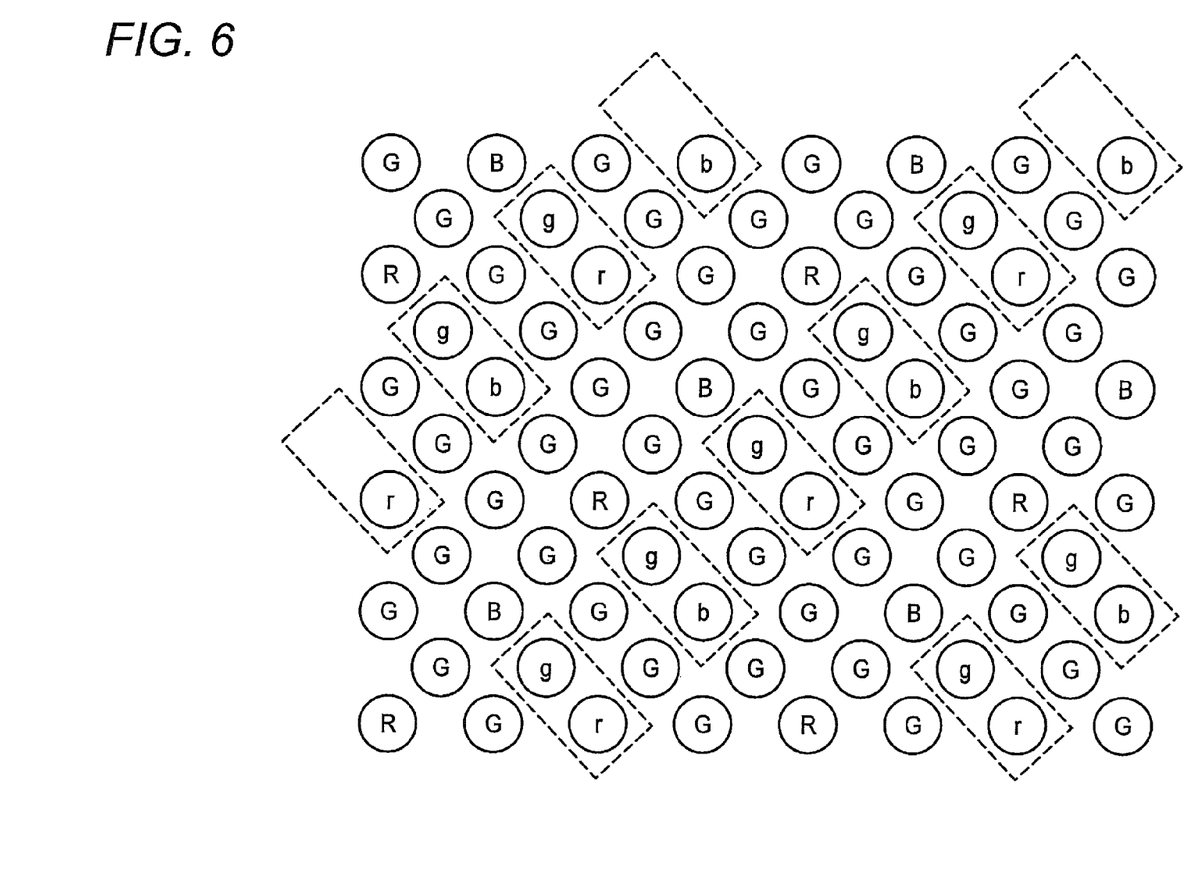
FIG. 6 is an explanatory view of an exemplary embodiment which is replaced with FIG. 5.

FIG. 6 is an explanatory view of a still other exemplary embodiment of the present invention. In the exemplary embodiment in FIG. 5, a g pixel for every two g pixels in the low-sensitivity pixel lines 45 in FIG. 3 is replaced with a high-sensitivity G pixel. When the high-sensitivity G pixel is disposed in the low-sensitivity pixel lines 45, the number of the low-sensitivity pixels is decreased and the resolution of the low-sensitivity is lowered.

Figure 7:
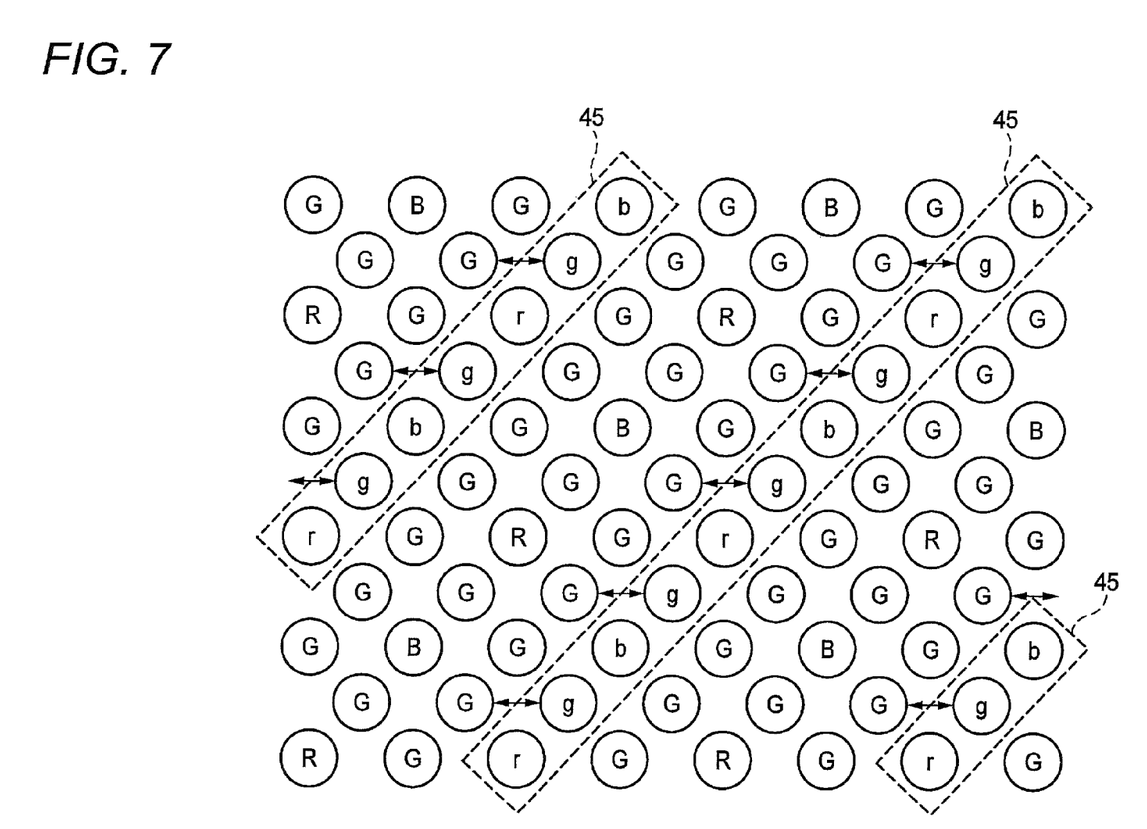
FIG. 7 is an explanatory view of the exemplary embodiment of FIG. 6.

As illustrated in FIG. 7 which is referring back to FIG. 3, the high-sensitivity G pixel and the low-sensitivity g pixel which are indicated by a double arrow have exchanged in their positions to each other (the position relation is rotated by 90 degrees for the adjacent b pixel or r pixel) to form a configuration in FIG. 6. Therefore, the resolution of the high-sensitivity in the inclined direction may be improved as in the exemplary embodiment in FIG. 5. As a result, a pair of adjacent r pixel and g pixel and a pair of adjacent r pixel and b pixel are disposed by one set inside in a quadrille array of the high-sensitivity G pixels of 5×5 in the inclined direction. Therefore, one pixel stacked with the G filter which are most adjacent (adjacent in the inclined direction) to a r pixel or a b pixel on the low-sensitivity imaging pixel lines, becomes a g pixel to be imaged with low-sensitivity.

Since the high-sensitivity G pixel contributes to the intensity information with a high rate, when more G pixels exist, the resolution may be increased, and the resolution of an image may be influenced by the resolutions in the longitudinal direction and the transverse direction. The low-sensitivity r pixel, the low-sensitivity b pixel, the high-sensitivity R pixel, and the high-sensitivity B pixel do not contribute to the resolution as much as the high-sensitivity G pixel. Furthermore, the low-sensitivity g pixel does not contribute to the resolution except the highlighted portion.

In the exemplary embodiment illustrated in FIG. 6, the high-sensitivity G pixels are disposed in a pixel line of every two lines (rows) in the left upward direction in a stripe form, and are disposed with a narrow space in the vertical direction and the horizontal direction. As a result, information of high resolutions in the longitudinal direction and the transverse direction may be obtained.

The high-sensitivity G pixel must be disposed in the up, down, left and right directions of the high-sensitivity R pixel, the high-sensitivity B pixel, the low-sensitivity r pixel, the low-sensitivity g pixel, and the low-sensitivity b pixel, and thus, the high-sensitivity image with the high resolutions in the longitudinal direction and transverse direction may be made. Further, the low-sensitivity r pixel and the low-sensitivity g pixel are disposed adjacently and the low-sensitivity r pixel and the low-sensitivity b pixel are disposed adjacently, and as a result, the low-sensitivity information where the color derivation thereof is small, may be obtained. As a result, a color image of a subject with a high resolution and a wide dynamic range which the color derivation thereof is small, may be obtained.

In the above-described exemplary embodiment, a pixel where the exposure times thereof are shorter than the exposure times of other pixel (the high-sensitivity pixel) in the same light receiving area is to be a low-sensitivity pixel, but it is preferable to make the exposure times equal over the entire pixels other than changing the exposure times, and to set a gain to be large in the high-sensitivity pixel and to be small in the low-sensitivity pixel, when the gain is amplified in AFE 22b of FIG. 1.

The difference of the high-sensitivity pixel and the low-sensitivity pixel is generated by changing the driving method, but the difference of the high-sensitivity pixel and the low-sensitivity pixel may be generated by a pixel structure. For example, the opening area of the light blocking film opening of the low-sensitivity pixel may be smaller than the opening area of the light blocking film opening of the high-sensitivity pixel. Further, the driving methods for the entire pixels may be the same while only the high-sensitivity pixel has a structure on which a micro-lens is stacked and the low-sensitivity pixel has a structure on which no micro-lens is stacked.

In the driving method of the solid-state imaging device as described above the even-numbered pixel row is disposed with a deviation from the odd-numbered pixel row by ½ pixel pitch, and a pixel line extending toward right-upwardly inclined direction and a pixel line extending toward left-upwardly inclined direction both are composed only of the pixels stacked with the green filter for every two lines. As a result, a pixel that constitutes one-side row of the odd-numbered row or the even-numbered rows of the pixels disposed in the rest of check pattern positions on which the pixels stacked with the green filter is not disposed, is a pixel stacked with the red filter, and a pixel that constitutes the other-side row is a pixel stacked with the blue filter. The method including driving the pixels stacked with the red filter and the pixels stacked with the blue filter which are presented on one line for every four lines of one-side pixel lines of the pixel line extending toward right-upwardly inclined direction and the pixel line extending toward left-upwardly inclined direction, and the pixels stacked with the green filter which is the most adjacent to pixels stacked with the red filter and the pixels stacked with the blue filter as a low-sensitivity pixel, and driving the rest of the pixels as a high-sensitivity pixel.

In the driving method of the solid-state imaging device of the exemplary embodiment, the pixel stacked with the green filter which is driven as a low-sensitivity pixel is disposed only at the same line of the pixel stacked with the red filter and the pixel stacked with the blue filter which are driven as a low-sensitivity pixel.

In the driving method of the solid-state imaging device of the exemplary embodiment, the pixel stacked with the green filter which is driven as a low-sensitivity pixel is a pixel stacked with the green filter disposed on every two pixels stacked with the green filter which exist on the same line.

In the driving method of the solid-state imaging device of the exemplary embodiment, the pixel stacked with the green filter which is included in the pixel line including the pixel stacked with the red filter and the pixel stacked with the blue filter which are forming the low-sensitivity pixels is driven as a high-sensitivity pixel, and concurrently, a pixel stacked with the green filter, which is adjacent to the pixel stacked with the red filter and the pixel stacked with the blue filter of the low-sensitivity pixels, of the pixels stacked with the green filter forming a pixel line which is adjacent to the pixel line is driven as a low-sensitivity pixel.

In the driving method of the solid-state imaging device of the exemplary embodiment, the exposure times of the low-sensitivity pixel are made to be shorter than the exposure times of the high-sensitivity pixel, and thus the low-sensitivity pixel is promoted to lower the sensitivity than the high-sensitivity pixel.

In the driving method of the solid-state imaging device of the exemplary embodiment, an amplifying rate where the output signal of the low-sensitivity pixel is amplified is made to be lower than an amplifying rate where the output signal of the high-sensitivity pixel is amplified, and thus the low-sensitivity pixel is promoted to lower the sensitivity than the high-sensitivity pixel.

Furthermore, the imaging apparatus of the exemplary embodiment includes a driving unit that drives according to any one driving method of the above-described methods, and a signal processing unit that obtains the imaging image signal of the pixel position of the low-sensitivity pixel by interpolating the signal with the imaging image signal of the surrounding high-sensitivity pixel.

In the imaging apparatus of the exemplary embodiment, the high-sensitivity pixels used in the interpolating operation are the imaging image signal of the pixel stacked with the green filter.

In the imaging apparatus of the exemplary embodiment, when the high-sensitivity pixel is in a saturation, the imaging image signal of the pixel position of the high-sensitivity pixel is obtained by interpolating the signal with the imaging image signal of the low-sensitivity pixel adjacent to the high-sensitivity pixel.

The solid-state imaging device of the exemplary embodiment includes a low-sensitivity pixel and a high-sensitivity pixel, in which the even-numbered pixel row is disposed with a deviation from the odd-numbered pixel row by ½ pixel pitch, a pixel line extending toward right-upwardly inclined direction and a pixel line extending toward left-upwardly inclined direction both are composed of only pixels stacked with the green filter for every two lines, a pixel that constitutes one-side row of the odd-numbered row or the even-numbered row of the pixels disposed in the rest of the check pattern positions on which the green filter stacked pixel is not disposed is a pixel stacked with the red filter and a pixel that constitutes the other-side row is a pixel stacked with the blue filter, the pixel stacked with the red filter and the pixel stacked with the blue filter which are presented on one line for every four lines of one-side pixel lines of the pixel line extending toward right-upwardly inclined direction and the pixel line extending toward left-upwardly inclined direction and the pixel stacked with the green filter which is the most adjacent to the pixel stacked with the red filter and the pixel stacked with the blue filter are configured as a low-sensitivity pixel, and the rest of the pixels are configured as a high-sensitivity pixel.

In the solid-state imaging device of the exemplary embodiment, the pixel stacked with the green filter of the low-sensitivity pixel is disposed only the same line of the pixel stacked with the red filter and the pixel stacked with the blue filter, which are of the low-sensitivity pixel.

In the solid-state imaging device of the exemplary embodiment, the pixel stacked with the green filter of the low-sensitivity pixel is a pixel stacked with the green filter disposed for every two pixels stacked with the green filter which exist on the same line.

In the solid-state imaging device of the exemplary embodiment, the pixel stacked with the green filter which is included in the pixel line including the pixel stacked with the red filter and the pixel stacked with the blue filter forming the low-sensitivity pixel is configured as a high-sensitivity pixel, and concurrently, a pixels stacked with the green filter, which is adjacent to the pixel stacked with the red filter and the pixel stacked with the blue filter of the low-sensitivity pixels, of the pixels stacked with the green filter forming a pixel line which is adjacent to the pixel line is configured as a low-sensitivity pixel.

In the solid-state imaging device of the exemplary embodiment, the opening area of the light blocking opening of the low-sensitivity pixel is smaller than the opening area of the light blocking area of the high-sensitivity pixel.

In the solid-state imaging device of the exemplary embodiment, a micro-lens is mounted in the high-sensitivity pixel and no micro-lens is mounted in the low-sensitivity pixel.

Furthermore, the imaging apparatus of the exemplary embodiment includes a driving unit that drives the solid-state imaging device, and a signal processing unit that obtains the imaging image signal of the pixel position of the low-sensitivity pixel by interpolating the signal with the imaging image signal of the surrounding high-sensitivity pixel.

In the imaging apparatus of the exemplary embodiment, the imaging image signal of the high-sensitivity pixel used in the interpolating operation is the imaging image signal of the pixel stacked with the green filter.

In the imaging apparatus of the exemplary embodiment, when the high-sensitivity pixel is in a saturation, the signal processing unit obtains the imaging image signal of the pixel position of the high-sensitivity pixel by interpolating the signal with the imaging image signal of the low-sensitivity pixel adjacent to the high-sensitivity pixel.

According to the above-described exemplary embodiments, it is possible to take a color image of a subject with the high resolution, the low positioned color, and the wide dynamic range.

Although the present invention has been described with reference to detailed and specific embodiments thereof, it is obvious to those skilled in the art that various changes or modifications may be made without departing from the sprit and scope of the present invention. The present application is based on a Japanese Patent Application (JP 2011-076343) filed on Mar. 30, 2011, and the disclosure of which is incorporated herein in its entirety by reference.

Industrial Applicability

The driving method of the solid-state imaging device according to the present invention may take a color image of a subject of high resolution and wide dynamic range where the color derivation is small, and therefore, may be applied to a digital or a mobile phone with a camera.

EXPLANATION OF REFERENCE NUMERALS AND SYMBOLS 10 digital camera (imaging apparatus)
21 imaging optical system
22 imaging device chip
22a solid-state imaging device
22b analogue signal processing unit (AFE)
23 driving unit
26 digital signal processing unit
29 system control unit
45, 46 low-sensitivity imaging pixel line

The invention claimed is:

1. A driving method of a solid-state imaging device in which an even-numbered pixel row is disposed with a deviation from an odd-numbered pixel row by ½ pixel pitch, both of a pixel line extending toward right-upwardly inclined direction and a pixel line extending toward left-upwardly inclined direction are composed of only pixels stacked with a green filter for every two lines, a pixel that constitutes one-side row of the odd-numbered pixel row or the even-numbered pixel row of the pixels disposed in the rest of check pattern positions on which the pixels stacked with the green filter is not disposed is a pixel stacked with a red filter and a pixel that constitutes the other-side row is a pixel stacked with a blue filter, the method comprising:

driving the pixel stacked with the red filter and the pixel stacked with the blue filter which are presented on one line for every four lines of one-side pixel lines of the pixel line extending toward right-upwardly inclined direction and the pixel line extending toward left-upwardly inclined direction, and the pixel stacked with the green filter which is most adjacent to the pixel stacked with the red filter or the pixel stacked with the blue filter as a low-sensitivity pixel, and driving the rest of the pixels as a high-sensitivity pixel.

2. The driving method of a solid-state imaging device of claim 1, wherein the pixel stacked with the green filter which is driven as a low-sensitivity pixel is disposed only on the same line of the pixel stacked with the red filter and the pixel stacked with the blue filter, which are driven as a low-sensitivity pixel.

3. The driving method of a solid-state imaging device of claim 2, wherein the pixel stacked with the green filter which is driven as a low-sensitivity pixel is a pixel stacked with the green filter disposed on every two pixels stacked with the green filter that exist on the same line.

4. The driving method of a solid-state imaging device of claim 1, wherein the pixel stacked with the green filter which is included in the pixel line including the pixel stacked with the red filter and the pixel stacked with the blue filter forming the low-sensitivity pixel is driven as a high-sensitivity pixel, and concurrently, a pixel stacked with the green filter, which is adjacent to the pixel stacked with the red filter and the pixel stacked with the blue filter of the low-sensitivity pixels, of pixels stacked with the green filter forming a pixel line which is adjacent to the pixel line, is driven as a low-sensitivity pixel.

5. The driving method of a solid-state imaging device of claim 1, wherein the exposure times of the low-sensitivity pixel are made to be shorter than the exposure times of the high-sensitivity pixel, and thus the low-sensitivity pixel is promoted to lower the sensitivity than the high-sensitivity pixel.

6. The driving method of a solid-state imaging device of claim 1, wherein an amplifying rate where the output signal of the low-sensitivity pixel is amplified is made to be lower than an amplifying rate where the output signal of the high-sensitivity pixel, and thus the low-sensitivity pixel is promoted to lower the sensitivity than the high-sensitivity pixel.

7. A solid-state imaging device comprising:
a low-sensitivity pixel; and
a high-sensitivity pixel,
wherein an even-numbered pixel row is disposed with a deviation from an odd-numbered pixel row by ½ pixel pitch, a pixel line extending toward right-upwardly inclined direction and a pixel line extending toward left-upwardly inclined direction both are composed of only pixels stacked with a green filter for every two lines, a pixel that constitutes one-side row of the odd-numbered pixel row or the even-numbered pixel row of the pixels disposed in the rest of check pattern positions on which the pixel stacked with the green filter is not disposed is a pixel stacked with a red filter and a pixel that constitutes the other-side row is a pixel stacked with a blue filter, and the filter stacked with the red filter and the pixel stacked with the blue filter which are presented on one line for every four lines of one-side pixel lines of the pixel line extending toward right-upwardly inclined direction and the pixel line extending toward left-upwardly inclined direction and the pixel stacked with the green filter which is most adjacent to pixel stacked with the red filter and the pixel stacked with the blue filter are configured as a low-sensitivity pixel, and the rest of the pixels are configured as a high-sensitivity pixel.

8. The solid-state imaging device of claim 7, wherein the pixel stacked with the green filter of a low-sensitivity pixel is disposed only on the same line of the pixel stacked with the red filter and the pixel stacked with the blue filter of a low-sensitivity pixel.

9. The solid-state imaging device of claim 8, wherein the pixel stacked with the green filter of a low-sensitivity pixel is a pixel stacked with the green filter disposed on every two pixels stacked with the green filter that exist on the same line.

10. The solid-state imaging device of claim 7, wherein the pixel stacked with the green filter which is included in the pixel line including the pixel stacked with the red filter and the pixel stacked with the blue filter forming the low-sensitivity pixel is configured as a high-sensitivity pixel, and concurrently, a pixel stacked with the green filter, which is adjacent to the pixel stacked with the red filter and the pixel stacked with the blue filter of the low-sensitivity pixels, of the pixels stacked with the green filter forming a pixel line which is adjacent to the pixel line is configured as a low-sensitivity pixel.

11. The solid-state imaging device of claim 7, wherein the opening area of the light blocking opening of the low-sensitivity pixel is smaller than the opening area of the light blocking opening of the high-sensitivity pixel.

12. The solid-state imaging device of claim 7, wherein a micro-lens is mounted in the high-sensitivity pixel and no micro-lens is mounted in the low-sensitivity pixel.

13. An imaging apparatus comprising:
a solid-state imaging device disclosed in claim 7;
a driving unit configured to drive the solid-state imaging device; and
a signal processing unit configured to interpolate the image signal of the pixel position of the low-sensitivity pixel with the imaging image signal of the surrounding high-sensitivity pixel.

14. The imaging apparatus of claim 13, wherein the imaging image signal of the high-sensitivity pixel used in the interpolating operation is the imaging image signal of the pixel stacked with the green filter.

15. The imaging apparatus of claim 13, wherein when the high-sensitivity pixel is in a saturation, the signal processing unit interpolates the imaging image signal of the pixel position of the high-sensitivity pixel using the imaging image signal of the low-sensitivity pixel adjacent to the high-sensitivity pixel.

16. The imaging apparatus of claim 14, wherein when the high-sensitivity pixel is in a saturation, the signal processing unit interpolates the imaging image signal of the pixel position of the high-sensitivity pixel using the imaging image signal of the low-sensitivity pixel adjacent to the high-sensitivity pixel.

* * * * *